G. D. HAWORTH.
Corn-Planters.

No. 146,451.  Patented Jan. 13, 1874.

Witnesses.
Theo Coleman
Buan J. Post

Inventor.
George D. Haworth,
Per. Chas P. Housum
Attorney

UNITED STATES PATENT OFFICE.

GEORGE D. HAWORTH, OF DECATUR, ILLINOIS.

IMPROVEMENT IN CORN-PLANTERS.

Specification forming part of Letters Patent No. 146,451, dated January 13, 1874; application filed July 16, 1873.

*To all whom it may concern:*

Be it known that I, GEORGE D. HAWORTH, of Decatur, State of Illinois, have invented a Corn-Planter, of which the following is a specification:

The object of my invention is to automatically operate the seed-slide of a corn-planter, (more especially designed for what is termed a "one-horse planter;") and consists of an arrangement of devices to be operated with a cord stretched across the field, provided with knobs placed at equal distances apart, automatically operating the seed-slide, and dropping the corn in check-rows, as hereinafter more fully described, being an improvement on Letters Patent granted to me February 22, 1870, No. 100,032.

Figure 1:
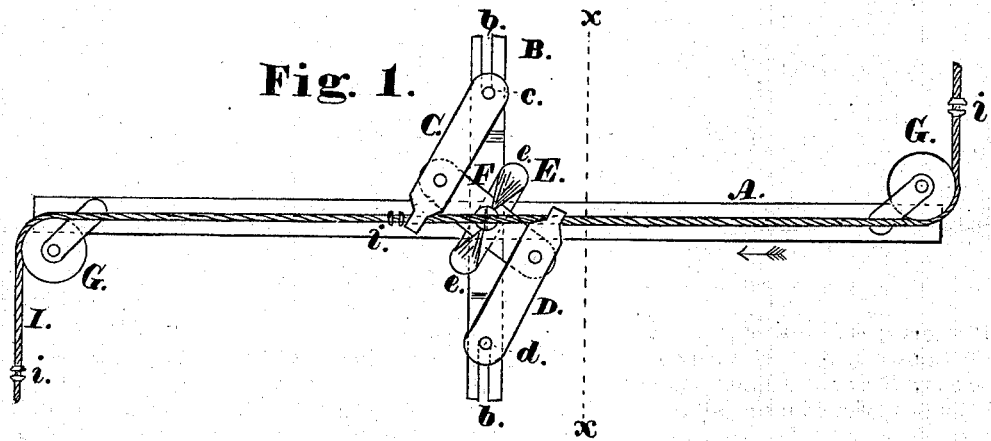
Figure 2:
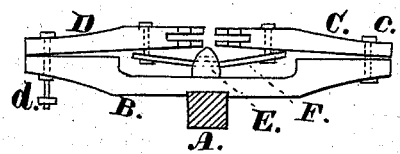

Figure 1 is a plan of the device; Fig. 2, a side view of the same, taken on the dotted lines $x\ x$, Fig. 1; and Fig. 3, a plan of the stop, partially in section.

A represents a bar fastened transversely across the planter; B, a cross-bar secured to the bar A. C D are slotted arms, pivoted at $c\ d$, said pivots sliding in slots $b\ b$ in the bar B. These arms are also pivoted at the ends of the reverser-bar F, said bar being secured at the center to the bar E, and both pivoted on the bar B. G G are pulleys at the ends of the bar A. I is the rope, provided with the stops $i$. The pivot $d$, or the arm D, is attached with rods to the seed-slide of the planter.

The operation of the device is as follows, viz: The rope or cord, being stretched across the field and anchored, is placed around the pulleys, as shown in Fig. 1. As the machine is drawn across the field, the rope passes across the bar in the direction shown by the arrow. The stop, catching in the slotted arm C, throws it in the position shown in Fig. 1, and by the reverser-bar F the arm D is thrown so that the following stop on the rope strikes it, throwing the arm C back to receive another stop, thus giving the pivot-$d$ and the seed-slide, which is attached thereto, a reciprocating motion. The knobs $e\ e$ on the bar E prevent the stop from striking in the opposite arm when the arms C and D are in line with the bar B, as shown in Fig. 2.

Figure 3:
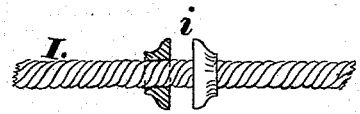

The stop consists of two pieces of malleable or wrought iron, $i$, rolled or formed as shown in Fig. 3, being made open, placed over and compressed upon the rope I, being placed at such a distance apart that they will allow of the rope bending when passing around the pulleys, and also, as the arms only strike on the one or outside of the stop, it will not work backward and forward, chafing and wearing the rope.

I claim as my invention—

1. The slotted arms C D, reverser-bar F, and guard-bar E, in combination with the rope I, as and for the purpose set forth.

2. The slotted bar B, slotted arms C D, and bars E and F, in combination with the bar A, rope I, and stops $i\ i$, as and for the purpose set forth.

GEORGE D. HAWORTH.

Witnesses:
CHARLES P. HOUSUM,
THEO. COLEMAN.